United States Patent [19]

Lohbauer

[11] 4,073,141
[45] Feb. 14, 1978

[54] FLUID CONTROL SYSTEM WITH PRIORITY FLOW

[75] Inventor: Kenneth R. Lohbauer, Joliet, Ill.

[73] Assignee: Caterpillar Tractor Co., Peoria, Ill.

[21] Appl. No.: 778,651

[22] Filed: Mar. 17, 1977

[51] Int. Cl.² .................. F15B 13/06; F15B 13/09
[52] U.S. Cl. .................................. 60/421; 60/486; 91/414
[58] Field of Search .................. 60/420, 421, 486; 91/414

[56] References Cited

U.S. PATENT DOCUMENTS

| | | | |
|---|---|---|---|
| 3,208,221 | 9/1965 | Schuetz | 91/414 X |
| 3,606,049 | 9/1971 | Gordon | 60/486 X |
| 3,693,350 | 9/1972 | Petro et al. | 91/414 X |
| 3,720,059 | 3/1973 | Schurawski et al. | 60/420 |
| 3,800,669 | 4/1974 | Distler | 91/411 R |
| 3,910,044 | 10/1975 | Symmank | 60/486 X |

*Primary Examiner*—Edgar W. Geoghegan
*Attorney, Agent, or Firm*—Frank L. Hart

[57] ABSTRACT

A fluid system has a plurality of pumps, left and right track motors and a plurality of work elements. First elements are provided for controllably delivering fluid from a first plurality of pumps to the left track motor and for controllably bypassing the left track motor and delivering fluid from at least one of the first plurality of pumps to a separate respective work element. Second elements are provided for controllably delivering fluid from a different plurality of said pumps to the right track motor and for controllably bypassing the right track motor and delivering fluid from at least one of the second plurality of pumps to a separate respective work element.

12 Claims, 2 Drawing Figures

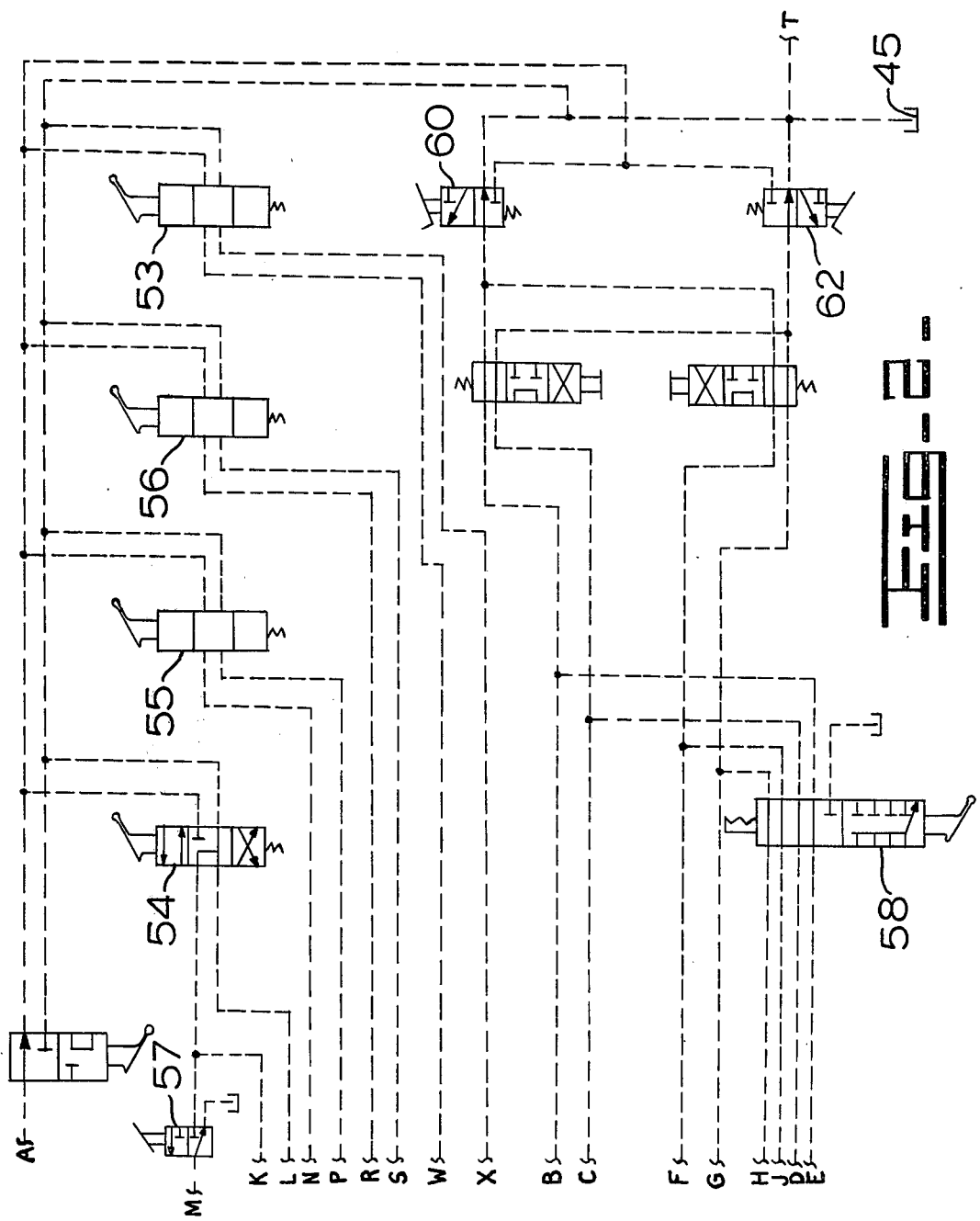

FLUID CONTROL SYSTEM WITH PRIORITY FLOW

BACKGROUND OF THE INVENTION

In fluid systems it is often desirable to provide for controllably passing fluid to selected locations in response to operating of controls. The greater the number of locations relative to the number of pumps and controls, the greater is the flexibility of the system.

An example use of such a fluid system is an excavator which has left and right track motors for locomotion and a plurality of work elements connected to the fluid system. In the use of an excavator, it is desirable to provide adequate fluid and pressure selectively to the work elements both while the vehicle is stationary and while the vehicle is moving. Further, it is also desirable to provide selective combining of pumps to a selected work element and to provide for more rapid movement of fluid from one of the work elements to tank.

These problems are not solved in the heretofore utilized excavators which generally connect the plurality of pumps in parallel relationship with the working elements.

The present invention is directed to overcoming one or more of the problems as set forth above.

According to the present invention, a fluid system has a plurality of pumps, left and right track motors, and a plurality of work elements. First elements are provided for controllably delivering fluid from a first plurality of said pumps to the left track motor and for controllably bypassing the left track motor and delivering fluid from at least one of the first plurality of pumps to a separate work element. Second work elements are provided for controllably delivering fluid from a second plurality of said pumps to the right track motor and for controllably bypassing the right track motor and delivering fluid from at least one of the second plurality of pumps to a separate respective work element.

BRIEF DESCRIPTION OF THE DRAWINGS

FIG. 2 is a diagrammatic view of the pilot portion of the system.

DETAILED DESCRIPTION OF THE INVENTION

Figure 1:
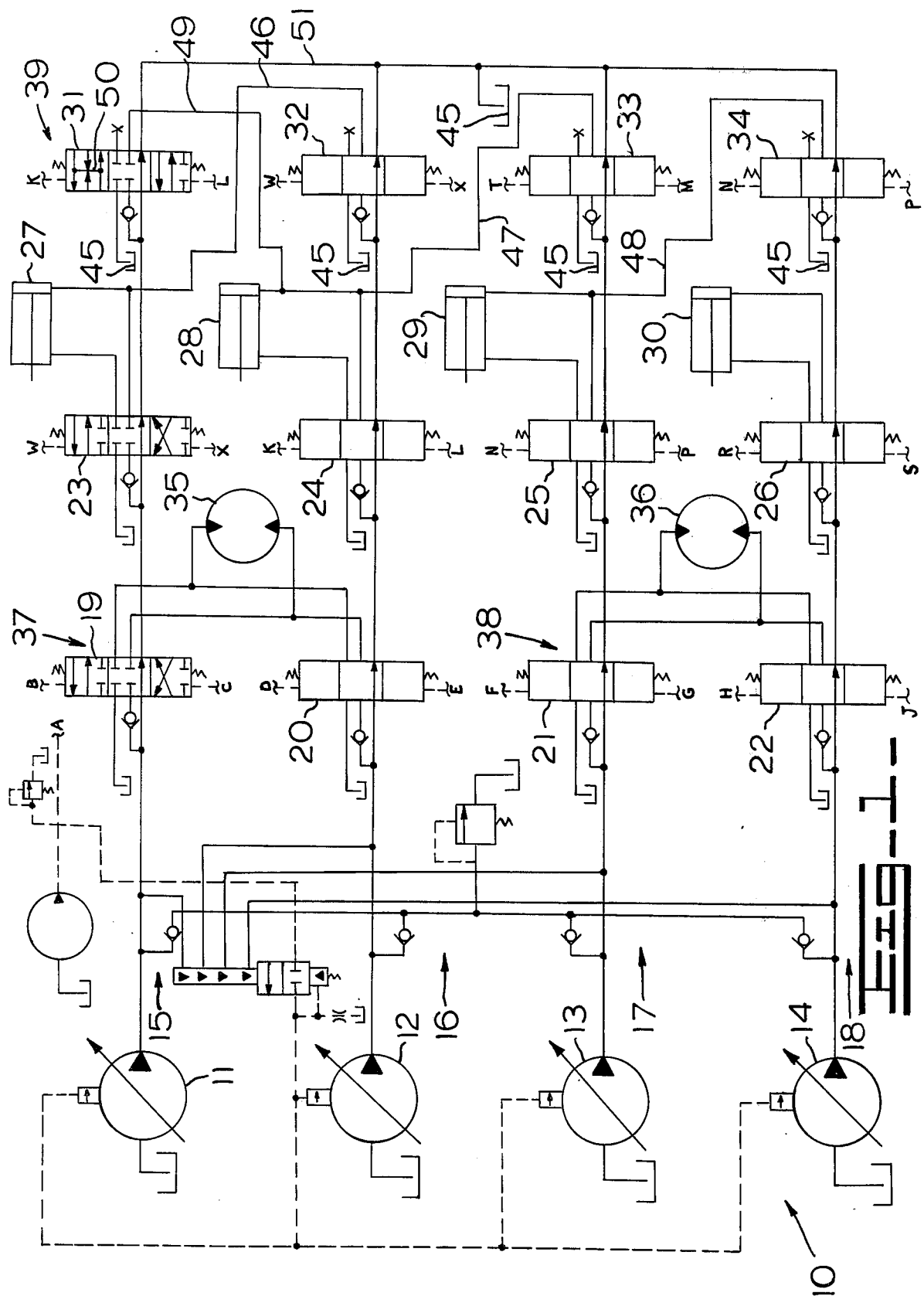
FIG. 1 is a diagrammatic view of the work portion of the system.

FIG. 1 and FIG. 2 are connectable to form the fluid system of this invention. It should be noted that the connection of the two figures is made by connecting lettered lines of FIG. 1 with lines of a common lettering on FIG. 2.

Referring to FIG. 1, the fluid system 10 has a plurality of pumps 11-14 which are preferably variable displacement pumps. Each of the pumps 11-14 serves a separate sub-circuit 15-18. Each of the sub-circuits comprises a respective primary control valve 19-22, a respective secondary control valve 23-26, a respective work element 27-30, and a respective selecting valve 31-34. Examples of the work elements for an excavator are a stick 27, boom 28, bucket 29 and swing 30.

The primary and secondary control valves 19-22 and 23-26 and the selecting valves 31-34 are preferably three position valves. Valves 19-26 are of like construction and valves 31-34 are of like construction.

The first and second primary control valves 19, 20 are positioned between and connected to a left track motor 35 and the third and fourth primary control valves 21, 22 are positioned between and connected to a right track motor 36. Immediately downstream from each primary control valve 19-22 is a respective secondary control valve 23-26. A respective work element 27-30 and respective selecting valve 31-34 are connected to and downstream of each secondary control valve 23-26.

The first and second primary control valves 19, 20 provide a first means 37 for controllably delivering fluid from a first plurality of pumps 11, 12 to the left track motor 35 and for controllably bypassing the left track motor 35 and delivering fluid from at least one, preferably each of the first plurality of pumps 11, 12 to a separate respective work element 27, 28. The third and fourth primary control valves 21, 22 provide a second means 38 for controllably delivering fluid from a second different plurality of pumps 13, 14 to the right track motor 36 and for controllably bypassing the right track motor 36 and delivering fluid from at least one, preferably each of the second plurality of pumps 13, 14 to a separate respective work element 29, 30. It should be noted that the primary and secondary control valves 19-22, 23-26 are each independently positionable at first, second, and third operational positions.

A third means 39 is provided for controllably, selectively passing fluid from the respective secondary control valves 23-26 of selected pumps to other work elements 27-30 which are in a different sub-circuit 15-18.

The system includes a fluid reservoir or tank 45 and each of the first and second means 37, 38 comprises a plurality of primary control valves 19-22 each connected to a respective pump 11-14, the respective track motor 35, 36 and a respective separate work element 27-30. In turn, the third means 39 comprises a plurality of secondary control valves 31-34.

Each secondary control valve 23-26 is connected to and between a respective primary control valve 19-22 and a respective work element 27-30. Each selecting valve 31-34 is connected to a respective secondary control valve 23-26, the tank 45 and a different work element than serviced by said respective secondary control valve 23-26.

As set forth above, the selecting valves 31-34 are each selectively positionable at a first position (shown) and a second downwardly shifted position at which fluid from the respective secondary control valve 23-26 is open to the tank 45 and a second upwardly shifted position at which fluid from the respective secondary control valve 23-26 is delivered to a work element of a different sub-circuit 15-18, for example, from selecting valve 32 to work element 27 via line 46, from selecting valve 33 to work element 28 via line 47, from selecting valve 34 to work element 29 via line 48 and from selecting valve 31 to work element 28 via line 49. It should be noted that at the downwardly shifted position of a selecting valve, the fluid from the associated secondary control valve can go to tank 45 via vertical passage 50 in the valve or be passed to tank 45 via line 51. It should also be apparent that fluid from the work element 27 can be quickly exhausted through both secondary control valve 23 and selecting valve 32 whenever selecting valve 32 is in its downward position. In its upward position it functions to provide a path for fluid from one circuit to combine with fluid in another circuit.

Referring to FIG. 2, a plurality of separate control elements 53-56 are each connected to a respective secondary control valve 23-26 for controllably shifting same. At least a portion of the control elements 53-56 are also connected to selected ones of the selecting valves 31-34 for simultaneously shifting said control valve and selecting valve in response to actuation of said controlling element. It should be noted, however, that the controlling valve connected to one secondary control valve of one sub-circuit is connected to the selecting valve of a different sub-circuit for this simultaneous shifting.

In the preferred example shown in the drawings, selecting valve 32 of the second sub-circuit 16 simultaneously shifts with the first secondary controlling valve 23 of the first sub-circuit 15, selecting valve 31 of the first sub-circuit 15 simultaneously shifts with the second secondary controlling valve 24 of the second sub-circuit 16 and the fourth selecting valve 34 of the fourth sub-circuit 18 simultaneously shifts with the third secondary control valve 25 of the third sub-circuit 17. Therefore, there is a simultaneous shifting between different sub-circuits 15, 16, 17, 18 serving both the left and right track 35, 36.

FIGS. 1 and 2 also show an auxiliary valve 57 connected to controlling element 54 and selecting element 33 with the opposed end of the selecting element 33 being connected to tank 45. The auxiliary valve 57 is manually actuatable to selectively simultaneously pass a common signal to secondary control valve 24 and both selecting valves 31, 33.

By this construction, utilizing the auxiliary valve 57 which is connected to selecting valve 33 at "M", fluid can be supplied from pumps 15, 16 and 17 simultaneously to work element 28. Alternately, selecting valve 33 can be associated with a separate controlling element that enables fluid from pump 17 to be passed to another circuit, such as a bottom dump bucket circuit.

A selector valve 58, as shown in FIG. 2, is shiftable between a first position shown and a second position. When in the position shown, any speed input from travel valves 60 and 62 will cause simultaneous operation of each primary control valve 19 through 22. When selector valve 58 is in its second position, only primary control valves 19 and 21 can be actuated with a given travel input from travel valves 60 and 62. The second position of selector valve 58 thus provides for travel of the vehicle and full simultaneous operation of at least two work elements in the system, such as work elements 28 and 30. Furthermore, if work elements 28 and 30 are not being used, then fluid coming through the secondary valves 24 and 26 can be utilized to supply fluid to the other two work elements 27 and 29.

By this construction, the system is capable of providing priority of at least one pump to each of the main control functions and also is capable of providing for simultaneous travel and operation of the work elements.

A study of the specification and drawings will therefore disclose a unique system which solves many of the heretofore problems encountered during use of an excavator as set forth above.

The embodiments of the invention in which an exclusive property or privilege is claimed are defined as follows:

1. In a fluid system having a plurality of pumps, left and right track motors, and a plurality of work elements, the improvement comprising:
   first means for controllably delivering fluid from a first plurality of said pumps to the left track motor and for controllably bypassing the left track motor and delivering fluid from each of the first plurality of pumps to a separate respective work element; and
   second means for controllably delivering fluid from a second different plurality of said pumps to the right track motor and for controllably bypassing the right track motor and delivering fluid from each of the second plurality of pumps to a separate respective work element.

2. A fluid control system, as set forth in claim 1, wherein each of the first and second means comprises a plurality of primary control valves each connected to a respective pump, a respective track motor and a respective separate work element.

3. A fluid control system, as set forth in claim 2, wherein the plurality of primary control valves of each first and second means are each independently positionable at first, second and third operational positions.

4. A fluid control system, as set forth in claim 1, including
   third means for controllably, selectively passing fluid from the respective secondary control valves of selected pumps to other work elements.

5. A fluid control system, as set forth in claim 4, including a tank and wherein each of the first and second means comprises a plurality of primary control valves each connected to a respective pump, the respective track motor and a respective separate work element and
   the third means comprises:
   a plurality of secondary control valves each connected to and between a respective primary control valve and a respective work element; and
   a plurality of selecting valves each connected to a respective secondary control valve, the tank, and a different work element than serviced by said respective secondary control valve.

6. A fluid control system, as set forth in claim 5, wherein the plurality of selecting valves are each selectively positionable at first and second positions at which fluid from the respective secondary control valve is open to the tank and a third position at which fluid from the respective secondary control valve is delivered to said different work element.

7. A fluid control system, as set forth in claim 6, wherein at preselected positions of the secondary control valves and selecting valves a fluid pathway from the work element is provided to the tank via a selecting valve other than its respective selecting valve.

8. A fluid control system, as set forth in claim 6, wherein each pump serves a separate respective subcircuit, each of said subcircuits comprises a respective primary control valve, a respective secondary control valve, a respective work element, and a respective selecting valve and including:
   a controlling element connected to a secondary control valve of one sub-circuit associated with the left track and to a selecting valve of another sub-circuit associated with the left track for simultaneously shifting said connected secondary control valve and selecting valve in response to said controlling element; and
   a controlling element connected to a secondary control valve of one sub-circuit associated with the right track and to a selecting valve of another sub-circuit associated with the right track for simultaneously shifting said connected secondary control valve and selecting valve in response to said controlling element.

9. A fluid control system, as set forth in claim 6, wherein one of the controlling elements is connected to a preselected secondary controlling valve and a preselected selecting valve and including:

an auxiliary valve connected to said one controlling element and a different preselected selecting valve for controllably and simultaneously delivering an operating signal from said one controlling element to both preselected selecting valves and the preselected secondary controlling element.

10. A fluid control system, as set forth in claim 9, wherein one of the preselected selecting valves is associated with the right track and the other preselected selecting valve is associated with the left track.

11. A fluid control system, as set forth in claim 1 wherein each of the primary control valves pass fluid from the respective pump to the respective track motor in first and second operational positions and from the respective pump toward the respective work element while bypassing said respective track motor at a third operational position.

12. In a fluid system having a plurality of pumps, left and right track motors, and a plurality of work elements, the improvement comprising:

first means for controllably delivering fluid from a first plurality of said pumps to the left track motor and for controllably bypassing the left track motor and delivering fluid from at least one of the first plurality of pumps to a separate respective work element;

second means for controllably delivering fluid from a second different plurality of said pumps to the right track motor and for controllably bypassing the right track motor and delivering fluid from at least one of the second plurality of pumps to a separate respective work element; and third means for controllably, selectively passing fluid from respective secondary control valves of selected pumps to other work elements.

* * * * *

UNITED STATES PATENT AND TRADEMARK OFFICE
CERTIFICATE OF CORRECTION

PATENT NO. : 4,073,141
DATED : February 14, 1978
INVENTOR(S) : Kenneth R. Lohbauer It is certified that error appears in the above-identified patent and that said Letters Patent are hereby corrected as shown below:

IN THE DRAWINGS

Change the letter "D" associated with valve 20 to the letter ---E---.

Change the letter "E" associated with valve 20 to the letter ---D---.

Change the letter "H" associated with valve 22 to the letter ---J---.

Change the letter "J" associated with valve 22 to the letter ---H---.

Change the letter "K" associated with valve 31 to the letter ---L---.

UNITED STATES PATENT AND TRADEMARK OFFICE
CERTIFICATE OF CORRECTION

PATENT NO. : 4,073,141
DATED : February 14, 1978
INVENTOR(S) : Kenneth R. Lohbauer It is certified that error appears in the above-identified patent and that said Letters Patent are hereby corrected as shown below:

IN THE DRAWINGS

Change the letter "L" associated with valve 31 to the letter ---K---.

Change the letter "W" associated with valve 32 to the letter ---X---.

Change the letter "X" associated with valve 32 to the letter ---W---.

Change the letter "N" associated with valve 34 to the letter ---P---.

Change the letter "P" associated with valve 34 to the letter ---N---.

Signed and Sealed this

Eleventh Day of December 1979

[SEAL]

Attest:

SIDNEY A. DIAMOND

Attesting Officer

Commissioner of Patents and Trademarks